(12) United States Patent
Tzeng (10) Patent No.: US 6,574,240 B1
(45) Date of Patent: Jun. 3, 2003

(54) APPARATUS AND METHOD FOR IMPLEMENTING DISTRIBUTED LAYER 3 LEARNING IN A NETWORK SWITCH

(75) Inventor: Shr-jie Tzeng, Fremont, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/487,289

(22) Filed: Jan. 19, 2000

(51) Int. Cl.[7] .............................. H04J 3/16; H04J 3/22
(52) U.S. Cl. .................. 370/469; 370/392; 370/395.32
(58) Field of Search ................... 370/389, 252, 370/255, 352, 355, 356, 391, 392, 394, 398, 395.32, 400, 401, 402, 415, 414, 413, 417, 418, 455, 469, 471

(56) References Cited

U.S. PATENT DOCUMENTS 5,953,335 A    9/1999  Erimli et al. ............... 370/390
6,094,435 A  * 7/2000  Hoffman et al. ............ 370/414
6,430,188 B1 * 8/2002  Kadambi et al. ........... 370/398

* cited by examiner

*Primary Examiner*—Douglas Olms
*Assistant Examiner*—Phirin Sam
(74) *Attorney, Agent, or Firm*—Manelli Denison & Selter PLLC; Leon R. Turkevich (57) ABSTRACT

A network switch, configured for performing layer 2 and layer 3 switching in an Ethernet (IEEE 802.3) network without blocking of incoming data packets, includes a network switch port having a port filter configured for evaluating an incoming data packet on an instantaneous basis. The filter is configured for determining the presence of prescribed layer 3 information in a received data packet. The port filter also signals a switch fabric of the network switch to learn the IP-MAC association of the data packet. The port filter determines whether or not the data packet is part of the data traffic between connected subnetworks of the network switch. With the port filter in the above configuration, the network is enabled to perform layer 3 and layer 2 switching for 100 Mbps and gigabit networks without blocking in the network switch.

15 Claims, 6 Drawing Sheets

APPARATUS AND METHOD FOR IMPLEMENTING DISTRIBUTED LAYER 3 LEARNING IN A NETWORK SWITCH

BACKGROUND OF THE INVENTION

1. Field of the Invention

The present invention relates to layer 3 learning and layer 3 switching of data packets in a non-blocking network switch configured for switching data packets between subnetworks.

2. Background Art

Local area networks use a network cable or other media to link stations on the network. Each local area network architecture uses a media access control (MAC) enabling network interface devices at each network node to access the network medium.

The Ethernet protocol IEEE 802.3 has evolved to specify a half-duplex media access mechanism and a full-duplex media access mechanism for transmission of data packets. The full-duplex media access mechanism provides a two-way, point-to-point communication link between two network elements, for example between a network node and a switched hub.

Switched local area networks are encountering increasing demands for higher speed connectivity, more flexible switching performance, and the ability to accommodate more complex network architectures. For example, commonly-assigned U.S. Pat. No. 5,953,335 discloses a network switch configured for switching layer 2 type Ethernet (IEEE 802.3) data packets between different network nodes; a received data packet may include a VLAN (virtual LAN) tagged frame according to IEEE 802.1q protocol that specifies another subnetwork (via a router) or a prescribed group of stations. Since the switching occurs at the layer 2 level, a router is typically necessary to transfer the data packet between subnetworks.

There have been efforts to enhance the switching performance of a network switch to include layer 3 (e.g., Internet protocol) processing. Current efforts have focused on the network switch performing the layer 2 and layer 3 processing of the incoming packets centrally within the network switch.

However, this approach may suffer serious drawbacks, as current layer 2 switches preferably are configured for operating in a non-blocking mode, where data packets can be output from the network switch at the same rate that the data packets are received. When the network switch is processing incoming data packets, layer 3 processing may overwhelm the network switch from being able to switch the incoming data packets at the wire rates (i.e. the network data rate).

SUMMARY OF THE INVENTION

There is a need for an arrangement that enables a network switch to provide layer 2 switching and layer 3 switching capabilities for 100 Mbps and gigabit links without blocking of the data packets.

There is also a need for an arrangement to enable a network switch port to instantaneously evaluate an incoming data packet and determine a layer 3 or higher protocol, to provide the associated switch fabric with sufficient time to process the incoming data packet according to the detected protocol.

There is also a need for an arrangement to enable a network switch port to evaluate an incoming data packet and determine whether the data packet is intended for a subnetwork connected to the network switch.

There is also a need for an arrangement to enable a non-blocking network switch to learn the associated layer 3 and layer 2 addresses for each network port of the network switch at the wire rate.

There is also a need for an arrangement to enable a network switch to evaluate an incoming data packet and determine an existing learned layer 3 address to provide layer 3 switching for the data packet within the network switch.

These and other needs are attained by the present invention, where a network switch for switching a data packet includes a plurality of ports for receiving a data packet. Each port includes a port filter configured for determining a presence of prescribed layer 3 switching information within the data packet. The network switch also includes a layer 3 switch logic for switching the data packet according to a layer 3 protocol in response to the presence of prescribed layer 3 switching information determined by the port filter. The network switch also includes a layer 2 switch logic for switching the data packet according to a layer 2 protocol in response to a lack of the presence of prescribed layer 3 switching information determined by the port filter. As a result, the port filter provides distributed layer 3 switching processing enabling the network switch to provide layer 3 and layer 2 switching capabilities for 100 Mbps or gigabit links without blocking of the data packets.

One aspect of the present invention provides a method of switching a data packet at a network switch port. The method includes receiving the data packet at least one port where the port includes a port filter, and determining by the port filter a presence of layer 3 switching information within the data packet. The method also includes switching the data packet according to a layer 3 protocol by a layer 3 switching logic in response to a presence of layer 3 switching information determined by the port filter. Alternatively, the method includes switching the data packet according to a layer 2 protocol by a layer 2 switching logic in response to an absence of layer 3 switching information determined by the port filter. The determination by the port filter of the presence or the absence of layer 3 switching information in the data packet provides distributed layer 3 processing among the network switch ports receiving the data packets, enabling the network switch to evaluate the data packets for layer 3 processing at wire data rates.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed in the appended claims.

BRIEF DESCRIPTION OF THE DRAWINGS

Reference is made to the attached drawings, wherein elements having the same reference numeral designations represent like element elements throughout and wherein.

BEST MODE FOR CARRYING OUT THE INVENTION

Figure 1:
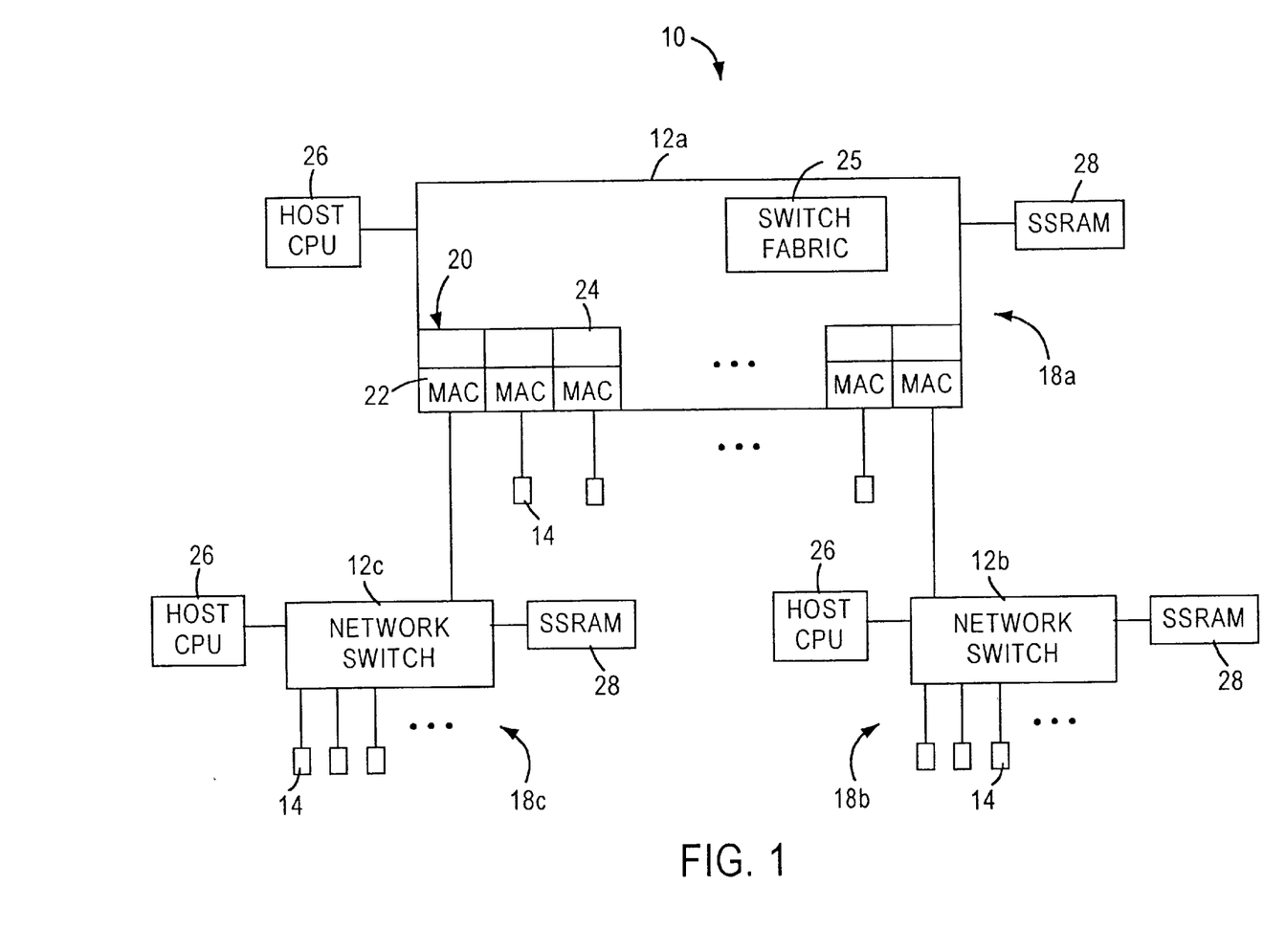
FIG. 1 is a block diagram of a packet switched network including multiple network switches for switching data packets between respective subnetworks according to an embodiment of the present invention.

FIG. 1 is a block diagram illustrating a packet switched network 10, such as an Ethernet (IEEE 802.3) network. The packet switched network includes integrated (i.e., single chip) multiport switches 12 that enable communication of data packets between network stations 14. Each network station 14, for example a client workstation, is typically configured for sending and receiving data packets at 10 Mbps or 100 Mbps according to IEEE 802.3 protocol. Each of the integrated multiport switches 12 are interconnected by gigabit Ethernet links 16, enabling transfer of data packets between subnetworks (or subents) 18a, 18b, and 18c. Hence, each subnetwork includes a switch 12, and an associated group of network stations 14.

Each switch 12 includes a switch port 20 that includes a media access control (MAC) module 22 and a port filter 24. The MAC module 20 transmits and receives data packets to the associated network stations 14 across 10/100 Mbps physical layer (PHY) transceivers (not shown) according to IEEE 802.3u protocol. Each switch 12 also includes a switch fabric 25 configured for making frame forwarding decisions for received data packets. In particular, the switch fabric 25 is configured for layer 2 switching decisions based on source address, destination address, and VLAN information within the Ethernet (IEEE 802.3) header; the switch fabric 25 is also configured for selective layer 3 switching decisions based on evaluation of an IP data packet within the Ethernet packet.

As shown in FIG. 1, each switch 12 has an associated host CPU 26 and a buffer memory 28, for example an SSRAM. The host CPU 26 controls the overall operations of the corresponding switch 12, including programming of the switch fabric 25. The buffer memory 28 is used by the corresponding switch 12 to store data frames while the switch fabric 25 is processing forwarding decisions for the received data packets.

As described above, the switch fabric 25 is configured for performing layer 2 switching decisions and layer 3 switching decisions. The availability of layer 3 switching decisions may be particularly effective if an end station 14 within subnetwork 18a wishes to send an e-mail message to selected network stations in subnetwork 18b, 18c, or both; if only layer 2 switching decisions were available, then the switch fabric 25 of switch 12a would send the e-mail message to switches 12b and 12c without specific destination address information, causing switches 12b and 12c to flood all their ports. Otherwise, the switch fabric 25 of switch 12a would need to send the e-mail message to a router (not shown), which would introduce additional delay. Use of layer 3 switching decisions by the switch fabric 25 enables the switch fabric 25 to make intelligent decisions as far as how to handle a packet, including advanced forwarding decisions, and whether a packet should be considered a high-priority packet for latency-sensitive applications, such as video or voice. Use of layer 3 switching decisions by the switch fabric 25 also enables the host CPU 26 of switch 12a to remotely program another switch, for example switch 12b, by sending a message having an IP address corresponding to the IP address of the switch 12b; the switch 12b, in response to detecting a message addressed to the switch 12b, can forward the message to the corresponding host CPU 26 for programming of the switch 12b.

Figure 2:
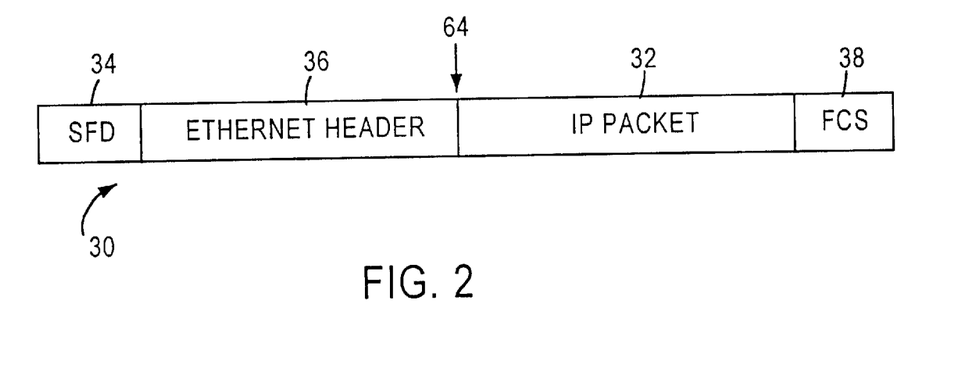
FIG. 2 is a diagram illustrating a conventional layer 2 Ethernet-type data packet carrying a layer 3 Internet protocol (IP) packet.

FIG. 2 is a diagram illustrating an Ethernet (IEEE 802.3) packet 30 carrying an IP packet 32 as payload data. Specifically, the Ethernet packet 30 includes a start frame delimiter (SFD) 34, an Ethernet header 36, the IP packet 32, and a cyclic redundancy check (CRC) or frame check sequence (FCS) field 38. Hence, a switch fabric 25 configured for layer 3 switching decisions needs to be able to quickly process the IP packet 32 within the received Ethernet frame 30 to avoid blocking of the frame within the switch, and to avoid the router's assistance if the received Ethernet frame is intended for the subnet directly connected to the network switch.

Figure 3:
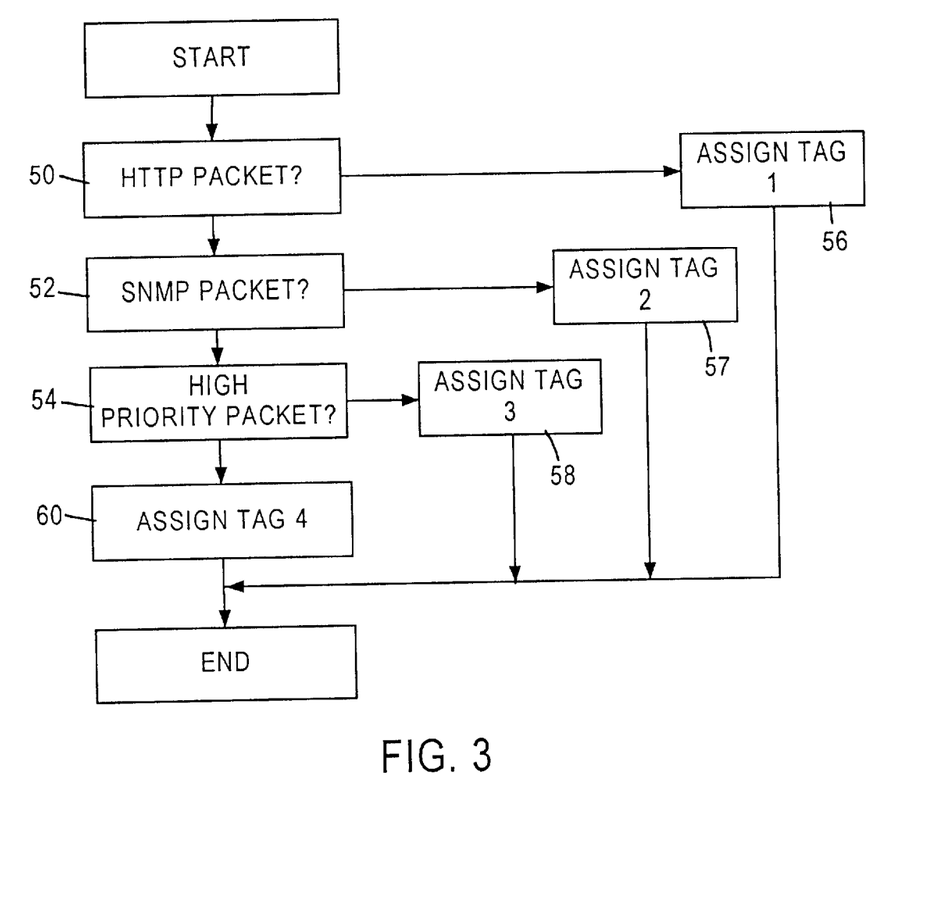
FIG. 3 is a flow diagram illustrating a conventional (prior art) method of evaluating an IP packet.

FIG. 3 is a flow diagram illustrating an example of the type of layer 3 processing that might be performed for an incoming data packet. The flow diagram of FIG. 3, conventionally implemented in software, would involve checking whether the incoming data packet was a hypertext transport protocol (HTTP) packet in step 50, an SNMP packet in step 52, or a high-priority packet in step 54. The appropriate tag would then be assigned identifying the packet in steps 56, 57, 58, or 60.

The arrangement of FIG. 3, however, cannot from a practical standpoint be implemented in hardware in a manner that would provide a non-blocking switch for 100 Mbps or gigabit networks. In particular, the sequential nature of the decision process in FIG. 3 would result in undue latency for the incoming data packet.

According to the disclosed embodiment, the port filter 24 of FIG. 1 is configured for determining a presence or an absence of prescribed layer 3 information, e.g., IP packet, in an incoming data packet. If the port filter 24 detects an absence of prescribed layer 3 information, the port filter 24 notifies a layer 2 switching logic of the switch fabric 25 to process the data packet according to layer 3 protocol. If the port filter 24 detects the presence of prescribed layer 3 information, the port filter 24 selectively notifies or signals a layer 2 switching logic of the switch fabric 25 to process the data packet according to layer 2 protocol. By filtering between the two types of protocols within the ports of the network switch, the processing of the data packets may be more efficiently by only forwarding data packets with the prescribed layer 3 information to the layer 3 switch logic versus sending all the data packets to the layer 3 switch logic. Furthermore, by distributing the filtering to the ports of the network switch, the switch fabric 25 may more efficiently switch data packets by removing the filtering function from the switch fabric 25.

Another aspect of the port filter 24 determining the presence of prescribed layer 3 information is notifying the switch fabric 25 to learn an Internet protocol ("IP")-media access control ("MAC") association of the data packet. For each port of the network switch, there is an associated MAC address. For each MAC address, there is an associated IP address. When the switch fabric 25 attempts to switch data packets according to layer 3 protocols, it determines the destination MAC address of the data packet from the destination IP address. The data packet is then forwarded according to the port associated with the destination MAC address i.e., layer 2 protocol. Thus, once the IP-MAC association is learned, the switch fabric 25 may efficiently process future data packets.

Another aspect of the port filter 24 determining the presence of layer 3 information is identifying routing between connected subnetworks. By identifying the subnetworks that are directly connected to the network switch, the switch fabric may modify existing IP-MAC associations by replacing the MAC address of the router with the MAC address of the destination network node in a data packet if the data packet is intended only for inter-subnetwork traffic. Hence, these data packets by-pass forwarding to and returning from the router. Thus, the data packets are more efficiently processed by the network switch 12.

Figure 4:
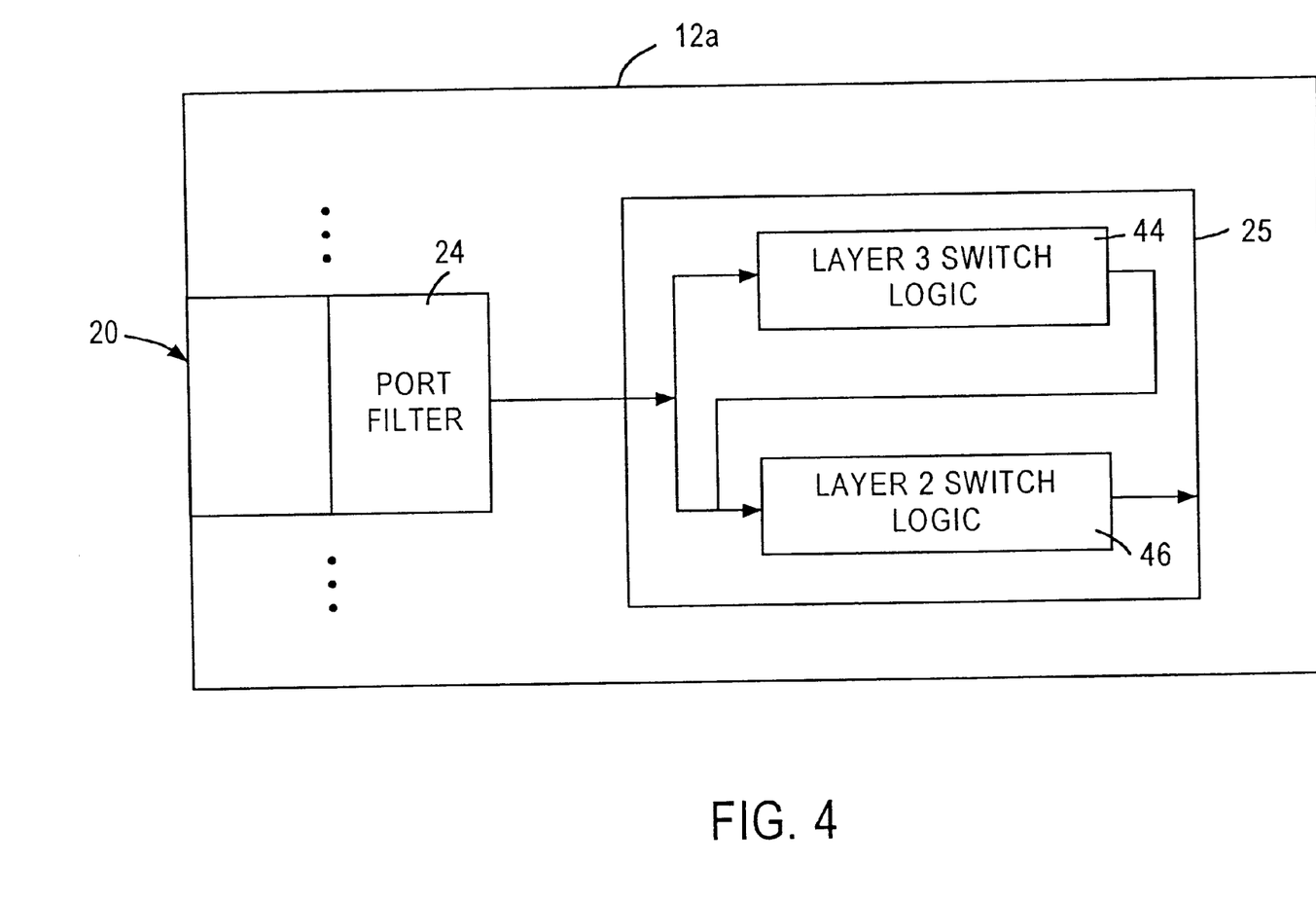
FIG. 4 is a block diagram illustrating a network switch of FIG. 1, including the network switch port filter, according to an embodiment of the present invention.

FIG. 4 is a block diagram illustrating in further detail the network switch port 20 of FIG. 1, including the network switch port filter 24, according to an embodiment of the present invention.

The network switch 12a, as shown in FIG. 4, includes a plurality of ports 20, and the switch fabric 25.

The port 20 receives data packets from a network station or a subnetwork connected to the port 20. The port 20 also transmits data packets from the network switch 12a to a network station or a connected subnetwork.

Each port filter 20 also includes a port filter 24. The port filter 24 is configured for a determination of a presence of layer 3 information in a received data packet. From the determination of the presence of prescribed layer 3 information, the port filter 24 indicates to the switch fabric 25 that layer 3 processing is to be performed for the received data packet. Also from the determination, the port filter 24 notifies or signals the switch fabric 25 that the receive data packet is intended for inter-subnetwork traffic.

The switch fabric 25 is configured for making frame forwarding decisions for received data packets. The switch fabric 25 includes a layer 3 switch logic 44 and a layer 2 switch logic 46. In particular, the layer 2 switch logic 46 is configured for layer 2 switching decisions based on source MAC address, destination MAC address, and VLAN information within the Ethernet (IEEE 802.3) header; the layer 3 switch logic 44 is also for selective layer 3 switching decisions based on evaluation of an IP data packet within the Ethernet packet.

The layer 3 switch logic 44 switches a received data packet according to layer 3 protocols in response to the port filter's 20 determination of the presence of prescribed layer 3 information. Each incoming data packet with prescribed layer 3 information detected contains a source and destination Internet protocol ("IP") address. Each data packet also contains a source and destination media access control ("MAC") address. In response to a learn signal from the port filter 24, the layer 3 switch logic 44 stores the source IP address along with the source MAC address, forming an association in a memory in the layer 3 switch logic 44. Hence, the layer 3 switch logic 44 "learns" the IP-MAC association of an incoming data packet when learning is enabled.

The layer 2 switch logic 46 switches a received data packet according to layer 2 protocols in response to the port filter's 20 determination of the absence of prescribed layer 3 information. For each received data packet with layer 3 information absent, the data packet contains a source and destination MAC address. The data packet also contains a source and destination port address. When enabled by the port filter 24, the layer 2 switch logic 46 stores the source MAC address along with the source port address in a memory in the layer 2 switch logic. Hence, the layer 2 switch logic 46 "learns" a MAC-port address association for the incoming data packet.

An incoming data packet enters the network switch 12a at switch port 20. The port filter 24 of FIG. 4 is configured for determining a presence or an absence of layer 3 information, e.g., IP packet, in an incoming data packet. If the port filter 24 detects an absence of layer 3 information, the port filter 24 notifies a layer 2 switching logic 46 of the switch fabric 25 to process the data packet. If the port filter 24 detects the presence of layer 3 information, the port filter 24 notifies or signals a layer 3 switching logic 44 of the switch fabric 25 to process the data packet.

As result of the processing by the switch fabric 25, a forwarding descriptor for the received data packet is generated. The forwarding descriptor is the resulting decision of the switch fabric 25 forwarding the received data packet to the appropriate output port.

Figure 5:
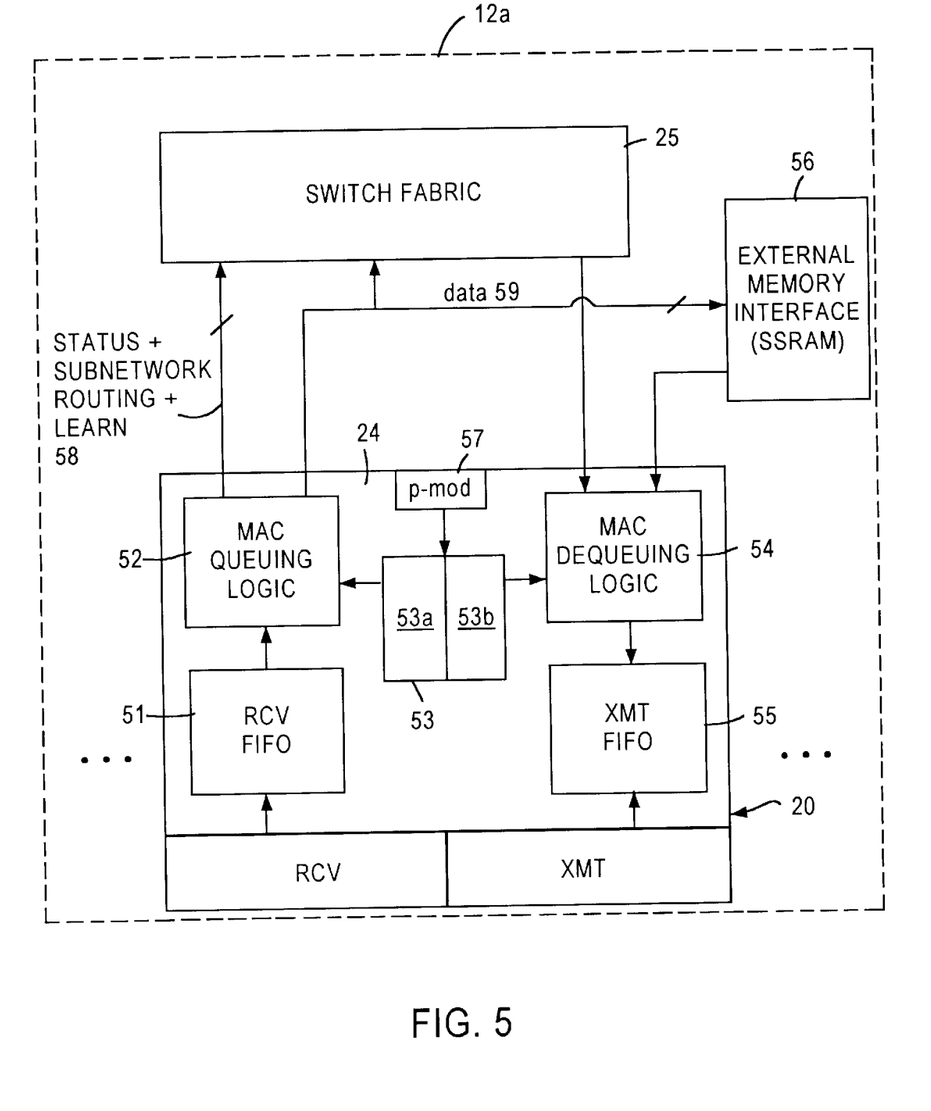
FIG. 5 is block diagram illustrating the network switch port filter of FIG. 4.

FIG. 5 illustrates a more detailed block diagram of the port filter 24 shown in FIG. 4. The port filter 24 includes a receive first-in-first out buffer (FIFO) 51, a MAC queuing logic 52, a memory 53, a MAC dequeuing logic 54, a transmit FIFO 55, and a processor interface module 57.

The receive FIFO 51 is a buffer that is configured for temporary storage of an incoming data packet in response to receiving the incoming data packet from the receive portion of the port 20.

The MAC queuing logic 52 provides for a variety of functions for the port filter 24. The MAC queuing logic 52 provides for writing a received data packet to the SSRAM 28 over a data bus 59 to an external memory interface 26 from the receive FIFO 51. The MAC queuing logic 52 also provides for a plurality of status signals 58 to the switch fabric 25 in response to the MAC queuing logic processing the received data packet. The status signals 58 provide an indication to the switch fabric 25 that the received data packet was transferred to the external memory interface 26 without error, or the transfer of the received data packet is complete. The status signals 58 also include a subnetwork routing signal (RNETS_ENABLE) and a learn signal (L3IRC_LEARN).

When the MAC queuing logic 52 sets the RNETS_ENABLE signal, the layer 3 switch logic 44 is notified that the received data packet is part of the inter-subnetwork traffic between subnetworks directly connected to the network switch 12a. The RNETS_ENABLE signal is also provided to the layer 2 switch logic 46.

When the MAC queuing logic 52 sets the L3IRC_LEARN, the layer 3 switch logic 44 is to learn an IP-MAC address association for the received data packet. The L3IRC_LEARN signal is also provided to the layer 2 switch logic 46.

The memory 53 provides register space 53a for parameters for the MAC queuing logic 52 to implement the learn and subnetwork routing functions. The register space 53a provides at least a VLANSUB_IDX, a SUBNET_ID1, a SUBNET ID2, a SUBNET_MASK1, and a SUBNET_MASK2 registers for the MAC queuing logic. The CPU 26 programs the registers via the processor interface (pi_mod) 57.

The VLANSUB_IDX register provides for specifying a subnetwork or subnet to a port for all the ports in the network switch 12.

The SUBNET_ID1 register provides for storage of the first 15-bits of an IP address. The SUBNET_ID1 register is indexed from the VLANSUB_IDX register.

The SUBNET_ID2 register provides for storage of the second 15-bits of an IP address. The SUBNET_ID2 register is indexed from the VLANSUB_IDX register.

The SUBNET_MASK1 provides for storage of the first 15-bits of an IP address mask. The SUBNET_MASK1 register is indexed from the VLANSUB_IDX register.

The SUBNET_MASK2 provides for storage of the second 15-bits of an IP address mask. The SUBNET_MASK2 register is indexed from the VLANSUB_IDX register.

The MAC dequeuing logic 54 provides for retrieving the received data packet from SSRAM 28 and forwarding the data packet to the appropriate port in response to the processing by the switch fabric 25.

The transmit FIFO 55 provides for a buffer for an outgoing data packet prior to transmission by the port 20.

An incoming data packet is received at the port 20 and is stored in the receive FIFO 51. The MAC queuing logic 52 forwards the data packet to the external memory interface 56 for storage in the SSRAM 28 over the data bus 59.

The MAC queuing logic 52 determines the presence of layer 3 information, e.g., IP data packet, in the received data packet by examining the header and frame data of the data packet. From the layer 3 information, the MAC queuing logic 52 may determine whether the received data packet is part of the inter-subnetwork traffic by comparing the received data packet with the registers stored in the memory 53.

Specifically, the received data packet is masked against the SUBNET_ID1 and SUBNET_ID2 registers. The result of the mask operation is then compared against the SUBNET_ID1 and SUBNET_ID2 registers. If the result of the compare operation is successful, the MAC queuing logic 52 sets the RNETS_ENABLE signal to the layer 3 switching logic 44 and layer 2 switching logic 46.

The MAC queuing logic 52 may also determine whether or not the switch fabric 25 needs to learn the source IP-MAC address association of the received data packet for IP addresses in the subnetworks that are directly connected to the network switch 12a. However, the L3IRC_LEARN signal is only asserted when the received data packet has been determined to part of inter-subnetwork traffic between subnetworks connected to the network switch 12a as discussed above.

Figure 6:
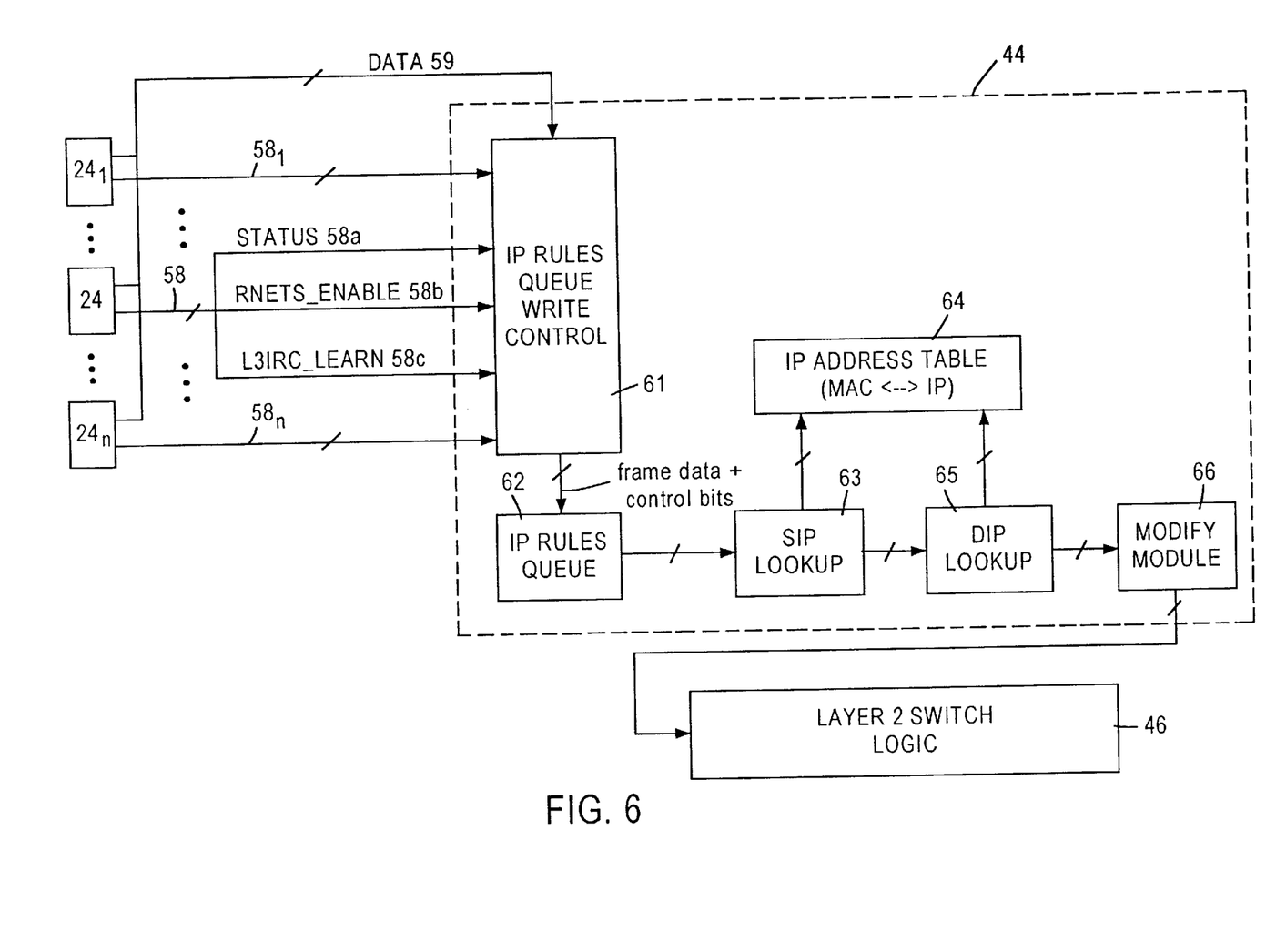
FIG. 6 is a block diagram illustrating the layer 3 switching logic of the network switch shown in FIG. 4.

FIG. 6 illustrates a more detailed block diagram of the layer 3 switch logic 44 of FIG. 4. The layer 3 switch logic 44 or layer 3 internal rules checker ("IRC") includes an internal rules ("IR") rules queue write control 61, an IP rules queue 62, a source IP ("SIP") lookup module 63, an IP address table 64, a destination IP ("DIP") lookup 65 and a modify module 66.

When the MAC queuing logic 52 asserts the L3IRC_LEARN signal, the layer 3 switch logic 44 may write the source IP address and MAC address association into IP address table 64, updating the table of learned IP addresses. Alternatively, the CPU 26 may periodically write the learned addresses from the layer 3 switching logic 44 into the learned IP address space 53b.

The IP rules queue write controller 61 provides for control of the write process to the IP rules queue 62. The IP rules queue write controller 61 snoops the data bus 59 to capture bytes of the received data packet during a transfer of the received data packet from the MAC queuing logic 52 to the external memory interface 56. If the status signals $58_a$ representing a transfer was completed without error and the L3IRC_LEARN signal $58_c$ was set by the MAC queuing logic 52 of the corresponding network switch port 24, the IP rules write controller 61 writes the first 40 bytes of the frame data to the IP rules queue 62. If the status signals 58 representing a transfer was completed without error and the RNETS_ENABLE signal $58_b$ was set by the MAC queuing logic 52 of the corresponding network switch port 24, the IP write controller 61 writes the first 40 bytes of frame data along with the first 40 bytes of data into the IP rules queue 62.

The IP rules queue write controller 61 also provides for appending control bits to the frame data written to the IP rules queue 62. The control bits provide for enabling the SIP lookup module 64, the DIP lookup module 65, and the modify module 66.

For the SIP lookup module 63, the IP rules queue write controller 61 sets a SIP_ENABLE bit in response to the L3IRC_LEARN signal $58_c$ being set by the MAC queuing logic 52. A set SIP_ENABLE bit enables the SIP lookup module 63 to write at least the source IP address of the data packet along with associated MAC address into the IP address table 64, i.e., "learning".

For the DIP lookup module 65, the IP rules queue write controller 61 sets a DIP_ENABLE bit in response to the RNETS_ENABLE $58_b$ signal being set by the MAC queuing logic 52. A set $DIP_{13}$ ENABLE bit enables the DIP lookup module 65 to retrieve an associated MAC address for a destination IP address of the received data packet from the IP address table 64, if the SIP lookup module 62 has already learned the IP-MAC address association.

For the modify module 66, the IP rules queue write controller 61 sets a MODIFY_ENABLE bit in response to the RNETS_ENABLE signal $58_b$ being set by the MAC queuing logic 52. A set MODIFY_ENABLE bit enables the modify module 66 to replace the destination MAC address of the data packet, originally the MAC address of a connected router, with the retrieved MAC address by the DIP lookup module 64.

The IP rules queue 62 provides for temporary storage of frame and header data of a received data packet in response to the IP rules queue write controller 61 receiving the set status signals representing an error free and end of transfer and at least one of a set RNETS_ENABLE signal $58_b$ or a set L3IRC_LEARN $58_c$ signal. The IP rules queue 62 comprises a number of individual rule queues for each for each port in the network switch 12.

The IP address table 64 provides for storage of IP-MAC address associations.

While the port filter 24 is writing the data packet to the external memory interface 56, the IP rules queue write controller 61 snoops the write operation to capture the first 40 bytes of the frame data of the data packet. When the transfer of the data packet has been completely transferred the MAC queuing logic 52 signals the end of the transfer and sets to status signals 58 to indicate that the frame was received without errors.

As part of the status signals 58, the RNETS_ENABLE signal $58_b$ or L3IRC_LEARN signal $58_c$ may be set by the MAC queuing logic 52 of one of the switch ports. If the L3IRC_LEARN signal $58_c$ is set, IP rules write controller 61 writes captured frame data is written into the IP rules queue 62 along with the control bit, SIP_ENABLE, set. If the RNETS_ENABLE signal $58_b$ is set, IP rules write controller 61 writes the captured frame data including the first 40 bytes of data is written into the IP rules queue 62 with the control bits, DIP_ENABLE and MODIFY_ENABLE, set.

The IP rules queue 62 operates as a FIFO type of queue. As frame data is being written into the IP rules queue 62, the SIP lookup module 63 is retrieving previously stored frame data for processing.

As SIP lookup module 63 retrieves stored frame data from the IP rules queue 62 and performs a lookup into the IP address table 64. If the IP address had been previously learned, the SIP lookup module 63 passes the stored frame data onto the DIP lookup module 65. Otherwise, the SIP lookup module 63 examines to see if the SIP_ENABLE bit had been set. If the SIP_ENABLE bit is set, the SIP lookup module 63 learns the source IP addresses by writing the source IP address along with the associated MAC address into the IP address table 64. If the SIP_ENABLE bit is not set, the frame data is passed to the DIP lookup module 65.

As the DIP lookup module 65 receives the frame data from the SIP lookup module 63, the DIP lookup module 64 examines the control bit DIP_ENABLE. If the DIP_ENABLE is set by the IP rules queue write controller, the DIP lookup module 65 attempts to retrieve an associated MAC address from the address table 64 for the destination IP source in the frame data.

If the layer 3 switch logic 44 has learned the IP-MAC address association and the DIP_ENABLE bit is set, the associated MAC address is forwarded to the modify module 66. If the layer 3 switch logic 44 has not learned the IP-MAC address association, the data packet is forwarded to layer 2 switch logic 46 for further processing.

If the associated MAC address has been received from the DIP lookup module 64 and the MODIFY_ENABLE bit is set, the modify module 64 replaces the MAC address in the frame data, which was the MAC address of the router, with the associated MAC address. Subsequently, the frame data is passed to the layer 2 switching logic 46 for further processing.

Figure 7:
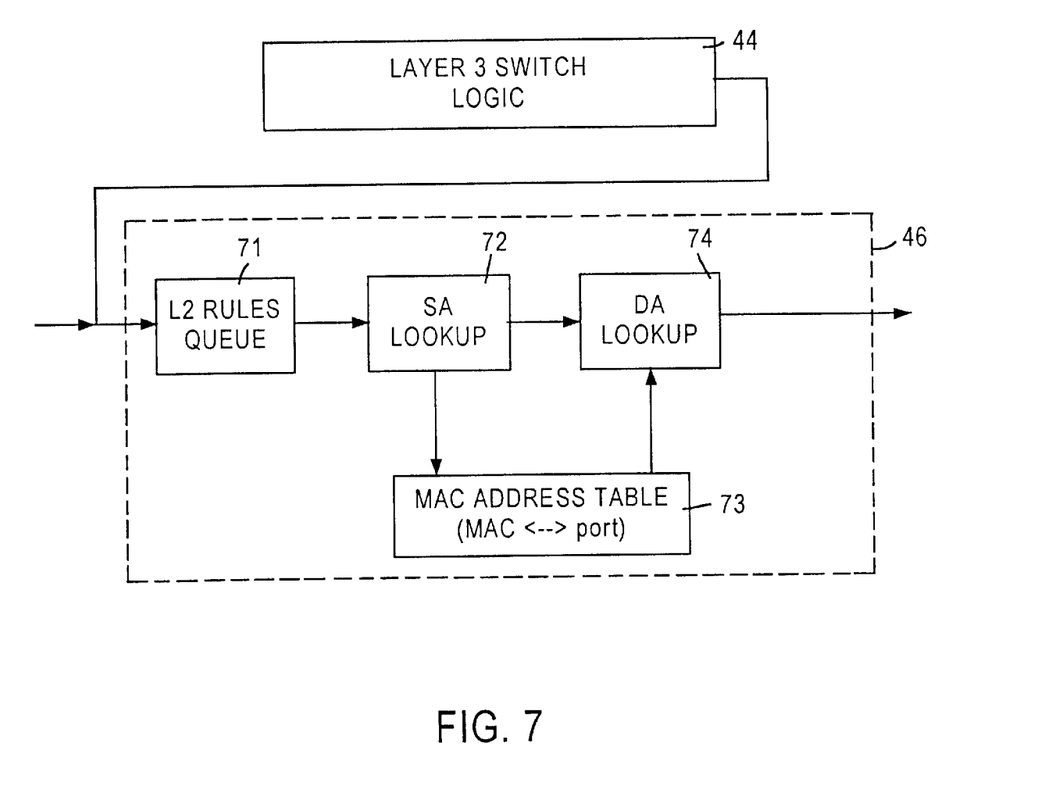
FIG. 7 is a block diagram illustrating the layer 2 switching logic of the network switch shown in FIG. 4.

FIG. 7 is a block diagram of the layer 2 switch logic 46 of the FIG. 4. The layer 2 switch logic 46 includes a L2 rules queue 71, a source address ("SA") lookup 72, an MAC address table 73, and a destination address ("DA") lookup 74.

The L2 rules queue 71 provides for temporary storage of the frame and header data layer 2 information of a received data packet for each port of the network switch 12. The L2 rules queue receives frame and header data from the layer 3 switch logic 44.

The SA lookup module 72 provides for the layer 2 switching logic 46 to learn the source MAC address of data packets. When the SA lookup module 72 is enabled, the SA lookup module 72 writes at least the source MAC address of the data packet along with associated port address.

The MAC address table 73 provides for storage of MAC-port address associations.

The DA lookup module 74 provides for retrieving an associated port address of the destination MAC address of the data packet if the SA lookup module 72 has already learned the MAC-port address association.

While the port filter 24 is writing the data packet to the external memory interface 56, the L2 rules queue 71 snoops the write operation to capture the first 40 bytes of the frame data of the data packet. When the transfer of the data packet has been completely transferred the MAC queuing logic 52 signals the end of the transfer and sets to status bits to indicate that the frame was received without errors. The L2 rules queue 71 operates as a FIFO type of queue. As frame data is being written into the L2 rules queue 71, the SA lookup module 72 is retrieving the stored frame data for further processing.

As SA lookup module 72 retrieves stored frame data from the L2 rules queue 71, the SA lookup module 72 checks to see if the source MAC address and associated port has been written into the MAC address table 73. If the MAC-port address association has not been written previously, the SA lookup module 72 writes the MAC-port address association into the MAC address table 73. The frame data is then passed to the DA lookup module 74. However, if the frame data had been forwarded from the modify module 65, the SA lookup module 72 is bypassed since the receive port and MAC address are not correct.

After receiving the frame data from the SA lookup module 72, the DA lookup module 74 retrieves an associated port from the address table 73 for the destination MAC source in the frame data. A forwarding descriptor is created from the frame data and the associated port. The forwarding descriptor is then used by the switch to forward the data packet to the appropriate output ports, where the dequeuing logic 54 in each of the designated output ports fetches the data packet from the external memory 28.

According to the disclosed embodiment, a network switch with a plurality of ports configured for layer 3 processing simplifies the implementation of the layer 3 processing in the network switch. Each port includes a port filter configured for determining a presence of prescribed layer 3 switching information within the data packet. The network switch also includes a layer 3 switch logic for switching the data packet according to a layer 3 protocol in response to the presence of prescribed layer 3 switching information determined by the port filter. The network switch also includes a layer 2 switch logic for switching the data packet according to a layer 2 protocol in response to a lack of the presence of prescribed layer 3 switching information determined by the port filter. As a result, the port filter provides distributed layer 3 switching processing enabling the network switch to provide layer 3 and layer 2 switching capabilities for 100 Mbps or gigabit links without blocking of the data packets.

While this invention has been described with what is presently considered to be the most practical preferred embodiment, it is to be understood that the invention is not limited to the disclosed embodiments, but, on the contrary, is intended to cover various modifications and equivalent arrangements included within the spirit and scope of the appended claims.

What is claimed is:

1. A network switch for switching a data packet, comprising:

at least one port for receiving said data packet, said at least one port including a port filter configured for determining a presence of layer 3 switching information within said data packet;

a layer 3 switch logic for switching said data packet according to a layer 3 protocol in response to the determined presence of the layer 3 switching information; and a layer 2 switch logic for switching said data packet according to a layer 2 protocol in response to a determined absence of the layer 3 switching information;

wherein the port filter outputs a learn signal to the layer 3 switch logic in response to determining an absence of the prescribed layer 3 switching information.

2. The network switch according to claim 1, wherein said layer 3 switching logic further comprising:

an internet-protocol rules queue to receive a header data from the data packet in response to said learn signal outputted from the port filter.

3. The network switch for switching a data packet according to claim 2, wherein said layer 3 switching logic further comprising:

a destination IP address module for retrieving from said address table a destination MAC address for said data packet by searching for a corresponding associated layer 3 address matching a destination IP address in the data packet; and a modify module for replacing an existing MAC address in said header data with said retrieved destination MAC address, and forwarding the header data having the retrieved destination MAC address to the layer 2 switching logic in response to said subnet signal and the layer 3 switching logic has learned said destination MAC address.

4. The network switch according to claim 3, wherein:

said modify module signals to the layer 2 switching logic not to write a source MAC address of said data packet.

5. The network switch according to claim 4, further comprising:

at least another port for transmitting the data packet according to said destination MAC address, the data packet received from the layer 2 switching logic.

6. The network switch according to claim 1, wherein said layer 3 switching logic further comprising:

an address table for storing a plurality of address entries, each including a layer 2 media access control address (MAC) and an associated layer 3 internet protocol (IP) address; and a source IP address module for writing the layer 2 MAC address and said associated layer 3 IP address of said data packet into the address table in response to said learn signal.

7. The network switch according to claim 6, further comprising:

at least another port for transmitting the data packet according to said destination MAC address, the data packet received from the layer 2 switching logic.

8. A network switch for switching a data packet, comprising:

at least one port for receiving said data packet, said at least one port including a port filter configured for determining a presence of layer 3 switching information within said data packet;

a layer 3 switch logic for switching said data packet according to a layer 3 protocol in response to the determined presence of the layer 3 switching information; and a layer 2 switch logic for switching said data packet according to a layer 2 protocol in response to a determined absence of the layer 3 switching information;

said port filter outputting a subnet signal to the layer 3 switch logic in response to determining the layer 3 switching information relates to at least one network station directly connected to said network switch.

9. The network switch according to claim 8, wherein said layer 3 switching logic further comprising:

an internet-protocol rules queue for receiving a header data and a portion of data from the data packet in response to said subnet signal outputted from the port filter.

10. A method for switching a data packet within an integrated network switch, comprising:

receiving said data packet by one of a plurality of ports;

determining a presence of prescribed layer 3 switching information in said data packet by a port filter within the one port;

switching said data packet according to one of a layer 3 protocol by a layer 3 switch logic and a layer 2 protocol by a layer 2 switch logic in response to said port filter determining the presence and an absence of the prescribed layer 3 switching information, respectively; and outputting a learn signal by the one port to said layer 3 switch logic in response to the port filter having determined an absence of said prescribed layer 3 switching information within a memory configured for storing existing layer 3 switching information having been learned by said layer 3 switch logic.

11. The method according to claim 10, further comprising:

receiving header data from said data packet into an internet-protocol rules queue in response to said learn signal outputted from said port filter.

12. The method according to claim 11, said layer 3 switching logic further comprising:

retrieving, by a destination IP address module with said layer 3 switching logic, a destination MAC address from said address table for said data packet by searching for a corresponding associated layer 3 address matching a destination IP address in the data packet; and replacing, by a modify module, an existing MAC address in said header data with said retrieved destination MAC address, and forwarding the header data having the retrieved destination MAC address to the layer 2 switching logic in response to said subnet signal and the layer 3 switching logic has learned said destination MAC address.

13. The method according to claim 10, wherein said layer 3 switching logic further comprising:

writing, by a source internet-protocol (IP) address module, a layer 2 MAC address and an associated layer 3 IP address of said data packet into an address table for storing a plurality of address entries, each entry including the layer 2 MAC address and the associated layer 3 IP address.

14. A method for switching a data packet within an integrated network switch, comprising:

receiving said data packet by one of a plurality of ports;

determining a presence of prescribed layer 3 switching information in said data packet by a port filter within the one port;

switching said data packet according to one of a layer 3 protocol by a layer 3 switch logic and a layer 2 protocol by a layer 2 switch logic in response to said port filter determining the presence and an absence of the prescribed layer 3 switching information, respectively; and outputting a subnet signal to said layer 3 switch logic in response to the port filter determining said prescribed layer 3 switching information relates to at least one network station directly connected to said network switch.

15. The method according to claim 14, further comprising:

receiving header data and a portion of data from said data packet into an internet-protocol rules queue in response to said subnet signal outputted from said port filter.

* * * * *